(12) United States Patent
Sheldon et al.

(10) Patent No.: US 7,796,157 B2
(45) Date of Patent: Sep. 14, 2010

(54) SYSTEM AND METHOD FOR MONITORING AND DIAGNOSIS OF VIDEO NETWORK PERFORMANCE

(75) Inventors: Robert D. Sheldon, Austin, TX (US); James H. Stephens, Jr., Austin, TX (US)

(73) Assignee: Tandberg Telecom AS, Lysaker (NO)

( * ) Notice: Subject to any disclaimer, the term of this patent is extended or adjusted under 35 U.S.C. 154(b) by 1090 days.

(21) Appl. No.: 11/489,622

(22) Filed: Jul. 20, 2006

(65) Prior Publication Data

US 2006/0256187 A1    Nov. 16, 2006

Related U.S. Application Data

(63) Continuation of application No. 10/021,194, filed on Oct. 30, 2001, now Pat. No. 7,154,533.

(51) Int. Cl.
*H04N 17/00* (2006.01)
(52) U.S. Cl. .......................... 348/192; 348/180; 702/81
(58) Field of Classification Search ................. 348/180, 348/192, 552, 722; 702/57, 66, 81, 122; 710/15, 29; 370/241, 248, 252; 714/25, 714/27, 30, 40, 46–48, 57, 712, 799
See application file for complete search history.

(56) References Cited

U.S. PATENT DOCUMENTS

| | | | |
|---|---|---|---|
| 4,821,269 A | 4/1989 | Jackson et al. | |
| 5,654,751 A | 8/1997 | Richard, III | |
| 5,719,942 A * | 2/1998 | Aldred et al. | 709/228 |
| 5,742,840 A | 4/1998 | Hansen et al. | |
| 5,995,490 A | 11/1999 | Shaffer et al. | |
| 6,297,845 B1 | 10/2001 | Kuhn et al. | |
| 6,366,314 B1 | 4/2002 | Goudezeune et al. | |
| 6,515,967 B1 | 2/2003 | Wei et al. | |
| 6,529,475 B1 * | 3/2003 | Wan et al. | 370/231 |
| 6,584,080 B1 | 6/2003 | Ganz et al. | |
| 6,618,077 B1 | 9/2003 | Baina et al. | |
| 6,753,887 B2 | 6/2004 | Carolan et al. | |
| 6,754,241 B1 | 6/2004 | Krishnamurthy et al. | |
| 6,788,696 B2 | 9/2004 | Allan et al. | |
| 6,795,435 B1 | 9/2004 | Jouppi et al. | |
| 6,798,751 B1 * | 9/2004 | Voit et al. | 370/252 |
| 6,847,395 B2 | 1/2005 | Thomas et al. | |
| 6,948,088 B1 | 9/2005 | Sharan | |
| 7,388,853 B2 * | 6/2008 | Ptasinski et al. | 370/338 |
| 2002/0097798 A1 | 7/2002 | Manor | |
| 2002/0186660 A1 * | 12/2002 | Bahadiroglu | 370/248 |

* cited by examiner

*Primary Examiner*—Victor Kostak
(74) *Attorney, Agent, or Firm*—Oblon, Spivak, McClelland, Maier & Neustadt, L.L.P.

(57) ABSTRACT

A system and method for diagnosis of video device performance in the transfer of audio visual data over a video network physically interfaces with the network to receive audio visual data associated with the video device of interest and uses diagnostic tools to access the audio visual data for determination of performance statistics with analysis of the accessed audio visual data, including video device jitter, latency, throughput, and packet loss.

6 Claims, 1 Drawing Sheet

SYSTEM AND METHOD FOR MONITORING AND DIAGNOSIS OF VIDEO NETWORK PERFORMANCE

TECHNICAL FIELD OF THE INVENTION

This invention relates generally to audio visual network communications, and more specifically relates to a system and method for monitoring and diagnosis of video network and device performance in transferring audio visual data over a video network.

BACKGROUND OF THE INVENTION

Video networks communicate audio visual data to allow participants in a video call to see and hear each other even over extended distances. Typically, video endpoints collect video images and audio signals from local participants, digitize the video images and audio signals, and compress the video images and audio signals for transfer over a network to a remote video endpoint. The digitized audio visual data is typically transferred over a number of different types of networks and with a number of different types of protocols and then converted to images and sounds at the remote location by decompressing the data and converting the data into video images and audio signals for presentation at the remote site.

Digitization, compression and decompression functions for transfer of audio and visual data are typically performed with specialized hardware known as CODECs, an abbreviation for compression\decompression. Compressed audio visual data may be sent through networks with equipment having a variety of degrees of specialization. For instance, a simple video teleconference might involve a direct dial up between two video endpoints, such as with an ISDN or T-1 connection. More complex video calls often involve specialized equipment such as multicall units (MCU) that coordinate conferences between three or more endpoints and such as gateway devices that coordinate communication between devices using different protocols. Such specialized devices are deployed in video networks to allow access by video endpoints as needed when a video call is configured and initiated across the video network. Alternatively, in TCP\IP networks that support video and voice over Internet Protocol, the functions of such specialized equipment are typically performed by software modules loaded on servers of the video network.

When a video call is established between video endpoints, the audio visual data is typically not accessible at a packet-level or CODEC-level as the audio visual data is routed between endpoints and through various video devices. Generally, video devices are designed to pass through audio visual data without extensive processing in order to avoid delays in the video conference presentation. For instance, the H.323 video conference protocol enables services such as call forwarding but avoids exposing audio visual data to a packet level or CODEC level as the data passes through the video network nodes. Although compliance with the H.323 protocol aids in establishing and maintaining high quality videoconferences, when quality problems do arise the inaccessibility of audio visual data as the data transfers through the video network makes the diagnosis of the problems difficult.

SUMMARY OF THE INVENTION

Therefore a need has arisen for a system and method which provides monitoring and diagnosis of video device performance in the transferring of audio visual data over a video network.

A further need has arisen for a system and method which provides real time monitoring and diagnosis of video device performance without introducing delays to audio visual data transfers.

In accordance with the present invention, a system and method are provided which substantially reduces the problems and disadvantages of diagnosing video device performance in the transfer of audio visual data over a video network. A diagnostic tool receives audio visual data associated with a video device and accesses the audio visual data to a predetermined level needed for diagnosis of the performance of the video device.

More specifically, a diagnostic node interfaces with a video network to receive audio visual data associated with one or more video devices of the video network. For instance, the diagnostic node operates as a transparent passthrough/proxy for a video device or as a regular terminating route in order to evaluate audio visual data and determine performance statistics associated with a predetermined video device that is proximate the diagnostic node. The diagnostic node includes a physical network interface with the video network and is deployable as a headless, dedicated, client-enabled device which hosts diagnostic tools operable to access audio visual data associated with a video device as the audio visual data passes through the network.

The diagnostic node includes diagnostic tools for accessing the audio visual data, such as an audio CODEC, a video CODEC and a packet sniffer. A diagnostic engine coordinates the evaluation of audio visual data by the diagnostic tools. For instance, the audio and the video CODECs expose the audio visual data for analysis of a broad range of statistics such as jitter, latency, throughput, packet loss and lip-synch, with analysis of audio data alone, video data alone or combined data. Similarly, the packet sniffer exposes audio visual data in TCP/IP packets for analysis of such statistics. Performance statistics are then forwarded through a communication agent, such as a web server or SNMP agent of the diagnostic node, through the video network for monitoring and analyzing the performance of the video device associated with the evaluated audio visual data.

The present invention provides a number of important technical advantages. One important technical advantage is that a diagnostic node determines performance statistics for one or more video devices with a dedicated and compact device having a simple physical interface to the video network. Thus, a dedicated device easily interfaces with the video network to allow a packet or CODEC-level evaluation of audio visual data and provide performance statistics otherwise unavailable due to the inaccessibility of the audio visual data by video devices. The dedicated device interfaces as a stand alone device able to forward the performance statistics for the desired video device through the video network.

Another important technical advantage of the present invention is that performance statistics for a predetermined video device are provided without introducing any substantial delays in the transfer of audio visual data across the video network. For instance, a diagnostic node is deployed as an H.323 endpoint or as an H.323 passthrough\proxy to provide diagnosis of video device performance in a transparent manner. Control of the diagnosis and communication of the performance statistic results may be provided through a communication agent, such as a web server or SNMP agent, that allows analysis of a network through distribution of diagnostic nodes at distal points of a video network.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the FIGURES, like numerals being used to refer to like and corresponding parts of the various drawings.

Video devices pass large quantities of audio visual data through video networks in order to support a video call. The audio visual data is compressed and decompressed by video endpoints to more effectively use video call bandwidth. However, the transmission of compressed audio visual data makes the diagnosis of problems with a video device difficult to accomplish. For instance, many deployed CODECs in H.323 protocol compliant devices do not expose audio visual data to allow analysis of video device performance. Thus, to detect and diagnose video network problems, packet-level and CODEC-level exposure of data from nodes of the video network is often needed.

Figure 1:
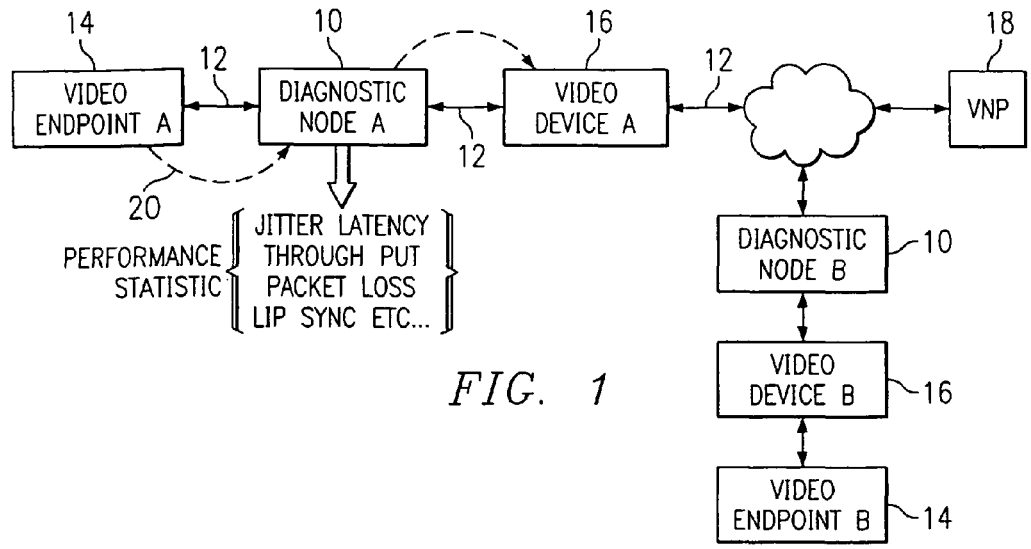
FIG. 1 depicts a block diagram of a diagnostic node deployed in a video network.

The present invention provides detailed level analysis of audio visual data through the distribution of one or more diagnostic nodes as dedicated devices interfaced with the video network. The diagnostic node allows analysis of audio visual data at a network layer to provide the performance statistics that allows real time monitoring and diagnosis of video devices. Referring now to FIG. 1, a block diagram depicts diagnostic nodes 10 deployed in a video network 12 between video endpoints 14 and another video device 16, such as a video endpoint, MCU or gateway. Diagnostic node 10 analyzes audio visual data passed through video network 12 to determine performance statistics such as jitter, latency, throughput, packet loss, lip-synch, etc.

Diagnostic node 10 is deployed as an H.323 protocol compliant terminating route or an H.323 protocol compliant passthrough proxy so that audio visual data passed through network 12 is available to the diagnostic node 10 without interfering with any on-going video calls. Diagnostic node 10 interfaces with video network 12 proximate to the video endpoint 14 or video device 16 being diagnosed and provides the results of the analysis of audio visual data associated with the video device through the video network, such as to a video network platform 18. For instance, the video network may be a local area network so that diagnostic node 10 is deployed as a compact, headless, dedicated client-enabled device distributed through the video network and interfaced with an Ethernet physical network interface. Diagnostic node 10 thus runs on a very thin hardware machine, such as a 400 MHz Pentium 3 with 32 megabytes of RAM and a 2 gigabyte hard drive that supports the network interface and hosts the diagnostic tools and engines.

The distribution of diagnostic nodes 10 through a video network permits a detailed analysis of audio visual data otherwise unavailable through network layer video device communications. Communication over the video network 12 with a video network platform 18 provides remote control and tracking of performance statistics generated by diagnostic node 10 so that the diagnostic node is simply a plug-in network device. Further, when deployed as a passthrough\proxy as indicated by dotted line 20, the diagnostic node 10 introduces minimal delay while obtaining full access to communications with a desired video device. In an embodiment deployed in a video over Internet Protocol network, the diagnostic node may also be a software module running on a server.

Deployed in the configuration illustrated by FIG. 1, the diagnostic nodes 10 isolate a difficulty in the transmission of audio visual data by determining which video network device is introducing errors to the data. For instance, if a lip sync problem exists at video endpoint 14B, then diagnostic nodes 10A and 10B determine the point in the network at which errors are introduced by measuring the lip sync quality. As audio visual data is transmitted from video endpoint 14A through the video network 12 to video endpoint 14B, diagnostic node 10A determines lip sync quality associated with video device 16A and diagnostic node 10B determines lip sync quality associated with video device 16B. If no lip sync error is associated with video device 16A but a determined level of lip sync error is associated with video device 16B, then the lip sync problem is isolated to video device 16B. Similarly, if a lip sync error of a determined level is associated with video device 16A and the level of the error remains unchanged at video device 16B, then the lip sync problem is isolated to video device 16A. By measuring changes in quality of lip sync as audio visual data is transmitted through the video network, diagnostic nodes 10 isolate problems in more than one video device, such as by comparing the error measurements sent to video network platform 18.

Figure 2:
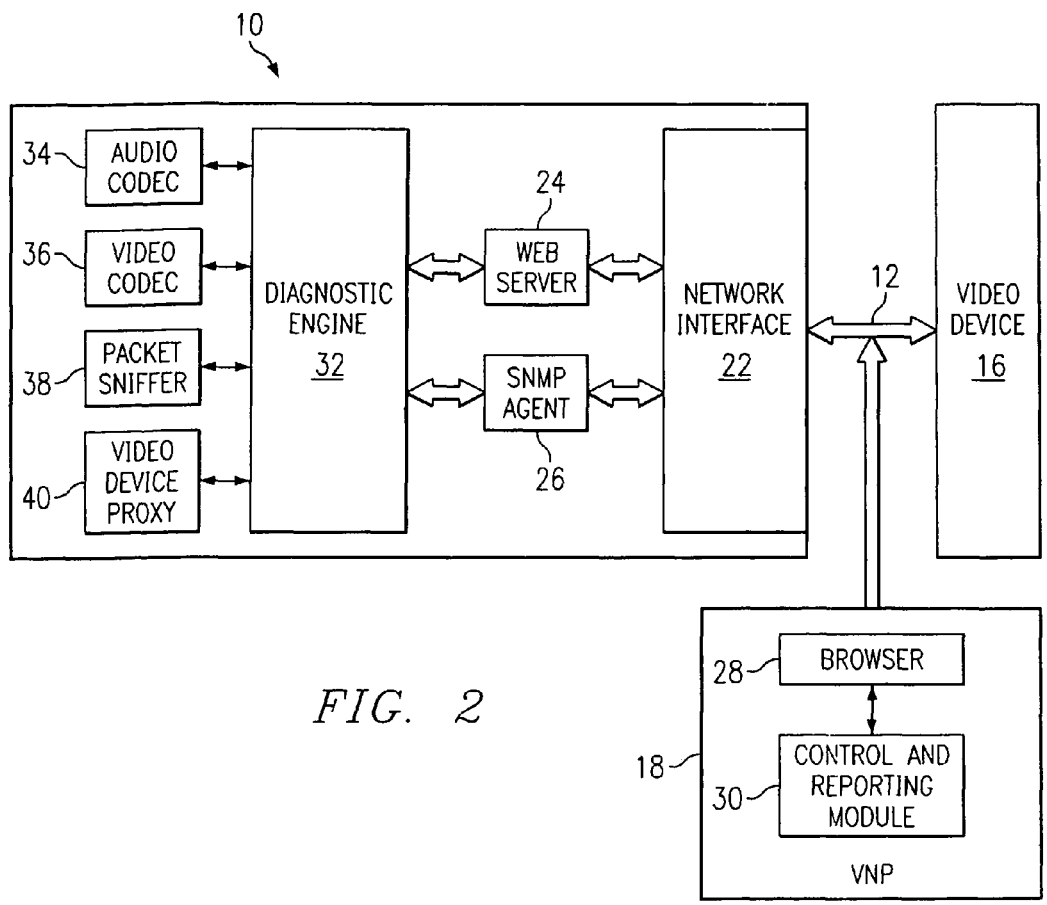
FIG. 2 depicts a block diagram of a diagnostic node.

Referring now to FIG. 2, a block diagram depicts one embodiment of a diagnostic node 10 interfaced through a network 12 to diagnose an associated video device 16, such as a video endpoint, MCU or gateway. Diagnostic node 10 communicates through a network interface 22 that physically connects diagnostic node 10 with network 12, such as an Ethernet interface to a local area network. Network interface 22 is a client-enabled device, such as with DHCP to support an Ethernet physical interface with a local area network that runs on such conventional operating systems as Linux or Windows. Communication agents such as a web server 24 or SNMP agent 26 provide access to diagnostic node 10 from clients interfaced through network 12 and network interface 22 to support control of video device monitoring and diagnosis as well as to communicate performance statistics. For instance, a browser on VNP 18 allows a control and reporting module 30 to communicate with diagnostic node 10 through web server 24. Alternatively, VNP 18 communicates directly with diagnostic node 10 using SNMP and SNMP agent 26.

Diagnostic engine 32 in diagnostic node 10 communicates with diagnostic tools, such as audio CODEC 34, video CODEC 36 and packet sniffer 38, to monitor audio visual data routed through diagnostic node 10 and to determine performance statistics. Audio CODEC 34 includes one or more instrumented audio CODECs, such as audio CODECs compliant with G.711, G.722, G.723, G.728, and G.729. Video CODEC 36 includes one or more instrumented video CODECs such as video CODECs compliant with H.261 and H.263. Packet sniffer 38 provides analysis of TCP/IP packets such as those that route audio visual data as video over Internet Protocol. A video device proxy 40 provides compliance with an appropriate protocol, such as compliance with the call signaling and control of H.323 protocol. Thus, video device proxy 40 supports deployment of diagnostic node 10 as an endpoint or a transparent H.323 passthrough\proxy. In this manner, audio visual data associated with video device 16 is routed to diagnostic node 10 and video device proxy 40 may determine appropriate audio visual data for analysis.

The instrumented CODECs 34 and 36 and the packet sniffer 38 allow diagnostic node 10 to have a detailed exposure to audio visual data associated with the monitored video device 16. Thus, diagnostic engine 32 uses this CODEC-level and packet-level exposure to interpret audio visual data at the desired level of detail and get audio and video metrics for detailed is analysis of the performance of video device 16. For instance, diagnostic engine 32 accepts audio visual data from an MCU video device and, essentially, plays the video call using the CODECs 34 and 36 to detect, as an example, lip-synch problems. Thus, if a difficulty arises during a video call, the deployment of plural diagnostic nodes 10 across the video network aids in pinpointing the video device or video devices introducing the difficulty. As a further example, the audio and visual codecs allow separate analysis of audio jitter and video jitter for a give video device.

Although the present invention has been described in detail, it should be understood that various changes, substitutions and alterations can be made hereto without departing from the spirit and scope of the invention as defined by the appending claims.

What is claimed is:

1. A system for transferring audio visual data over a video network, the system comprising:
    a first video device configured to communicate audio visual data to a second video device through the video network;
    a first diagnostic device connected to the first video device and configured to obtain audio and video metrics of audio visual data output by the first video device;
    a second diagnostic device connected to the second video device and configured to obtain audio and video metrics of audio visual data output by the second video device, wherein the first diagnostic device and the second diagnostic each include,
        a diagnostic tool configured to access audio visual data as it travels over said video network, and
        a diagnostic engine interfaced with the diagnostic tool and configured to determine performance statistics by analysis of the audio visual data accessed with the diagnostic tool, wherein the diagnostic tool is further configured to analyze the audio visual data at a network layer; and
    a video analyzing device configured to determine a point in the video network at which errors are introduced into the audio visual data.

2. The system of claim 1, wherein video analyzing device is configured to receive first lip sync data from the first diagnostic device and second lip sync data from the second diagnostic device, and to determine the point in the video network at which errors are introduced into the audio visual data based on a comparison of the first lip sync data and the second lip sync data.

3. The system of claim 1, further comprising:
    the second video device configured to communicate audio visual data to the first video device.

4. The system of claim 1, wherein the performance statistic comprises one of jitter, latency, throughput, packet loss, and lip sync.

5. The system of claim 1, wherein either or both the first and second diagnostic devices is configured as a one of a passthrough\proxy.

6. The system of claim 1, wherein the diagnostic tool comprises one of a video CODEC, an audio CODEC, and a packet sniffer.

* * * * *